(12) United States Patent
Wakabayashi

(10) Patent No.: US 12,519,743 B2
(45) Date of Patent: Jan. 6, 2026

(54) STORAGE MEDIUM, INFORMATION PROCESSING APPARATUS, AND CONTROL METHOD FOR EXECUTING NOTIFICATION OPERATIONS

(71) Applicant: CANON KABUSHIKI KAISHA, Tokyo (JP)

(72) Inventor: Yuuki Wakabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,522

(22) Filed: Nov. 23, 2022

(65) Prior Publication Data
US 2023/0171219 A1    Jun. 1, 2023

(30) Foreign Application Priority Data

Nov. 29, 2021 (JP) .................. 2021-193679

(51) Int. Cl.
*G06F 15/16* (2006.01)
*H04L 51/224* (2022.01)
(52) U.S. Cl.
CPC .................. *H04L 51/224* (2022.05)
(58) Field of Classification Search
CPC .................................................. H04L 51/251
See application file for complete search history.

(56) References Cited

U.S. PATENT DOCUMENTS

2017/0083165 A1* 3/2017 Ali ...................... H04L 41/0622
2021/0337039 A1* 10/2021 Dukellis ................. G06F 9/542

FOREIGN PATENT DOCUMENTS

JP      2008283474 A    11/2008
JP      2014239323 A    12/2014

* cited by examiner

*Primary Examiner* — Padma Mundur
(74) *Attorney, Agent, or Firm* — Canon U.S.A., Inc. IP Division

(57) ABSTRACT

A storage medium stores a program for causing a computer of an information processing apparatus to execute operations. The operations include first acquiring for acquiring first information for executing notification operations, second acquiring for acquiring second information for executing the notification operations, the second information being different from the first information, and performing control not to execute at least one of a plurality of operations included in the notification operations based on the second information, upon acquisition of the second information before a predetermined time period has elapsed since the acquisition of the first information in the second acquisition executed after the first acquisition.

15 Claims, 6 Drawing Sheets

STORAGE MEDIUM, INFORMATION PROCESSING APPARATUS, AND CONTROL METHOD FOR EXECUTING NOTIFICATION OPERATIONS

BACKGROUND

Field

The present disclosure generally relates to information processing and, more particularly, to a storage medium, an information processing apparatus, and a control method for executing notification operations.

Description of the Related Art

A known technique informs a user, when a terminal apparatus receives information, that the information has been received, by using a notification sound or a vibration sound caused by a physical vibration. Another known technique restricts a notification sound or a vibration sound so that the relevant sounds are not perceived as noise. For example, Japanese Patent Application Laid-Open No. 2008-283474 discusses a technique for restricting a vibration sound. When a mobile phone enters a stationary state from a moving state, the technique determines the orientation of the mobile phone. When it is determined that the mobile phone is placed at a position where the vibration sound rings, the technique restricts the vibration sound.

Further convenience is desirable for a technique for informing a user that a terminal apparatus has received information.

SUMMARY

According to an aspect of the present disclosure, a storage medium stores a program for causing a computer of an information processing apparatus to execute operations. The operations includes first acquiring for acquiring first information for executing notification operations, second acquiring for acquiring second information for executing the notification operations, the second information being different from the first information, and performing control not to execute at least one of a plurality of operations included in the notification operations based on the second information, upon acquisition of the second information before a predetermined time period has elapsed since the acquisition of the first information in the second acquisition executed after the first acquisition.

Further features of the present disclosure will become apparent from the following description of exemplary embodiments with reference to the attached drawings.

DESCRIPTION OF THE EMBODIMENTS

Figure 1:
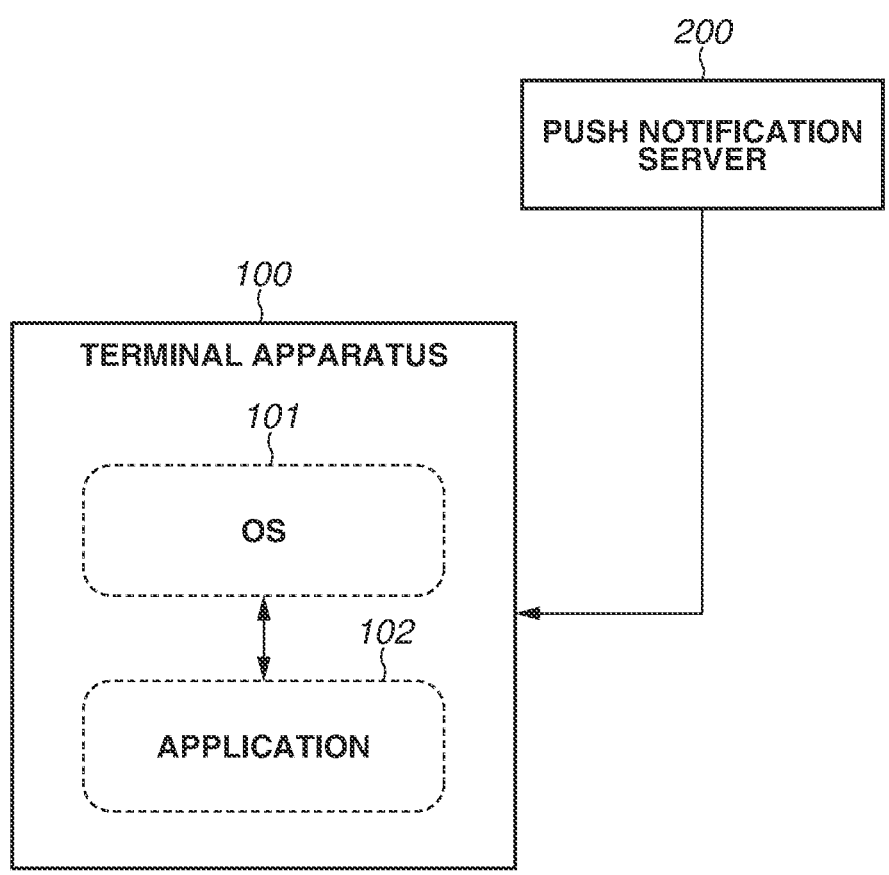
FIG. 1 illustrates a system configuration.

The present disclosure will be described in detail below with reference to the accompanying drawings. The following exemplary embodiments do not limit the present disclosure within the ambit of the appended claims. Not all of the combinations of the features described in the present exemplary embodiments are indispensable to the solutions for the present disclosure. In the accompanying drawings, identical or similar components are assigned the same reference numerals, and duplicated descriptions thereof will be omitted.

FIG. 1 illustrates a system configuration according to a first exemplary embodiment. The system according to the present exemplary embodiment includes a terminal apparatus 100 and a push notification server 200. The terminal apparatus 100 is an information processing apparatus in which an operating system (hereinafter referred to as an OS) 101 and an application program (hereinafter referred to as an application) 102 are installed.

In the system illustrated in FIG. 1, each apparatus is communicably connected. For example, the terminal apparatus 100 and the push notification server 200 outside the terminal apparatus 100 are communicably connected via the Internet (not illustrated).

The terminal apparatus 100 is, for example, an information processing apparatus, such as a personal computer (PC) and a smart phone. Various types of apparatuses such as digital cameras may be applied as the terminal apparatus 100 according to the present exemplary embodiment.

The push notification server 200 is an information processing apparatus having a function of transmitting push notification information (described below) to the terminal apparatus 100.

Figure 2A:
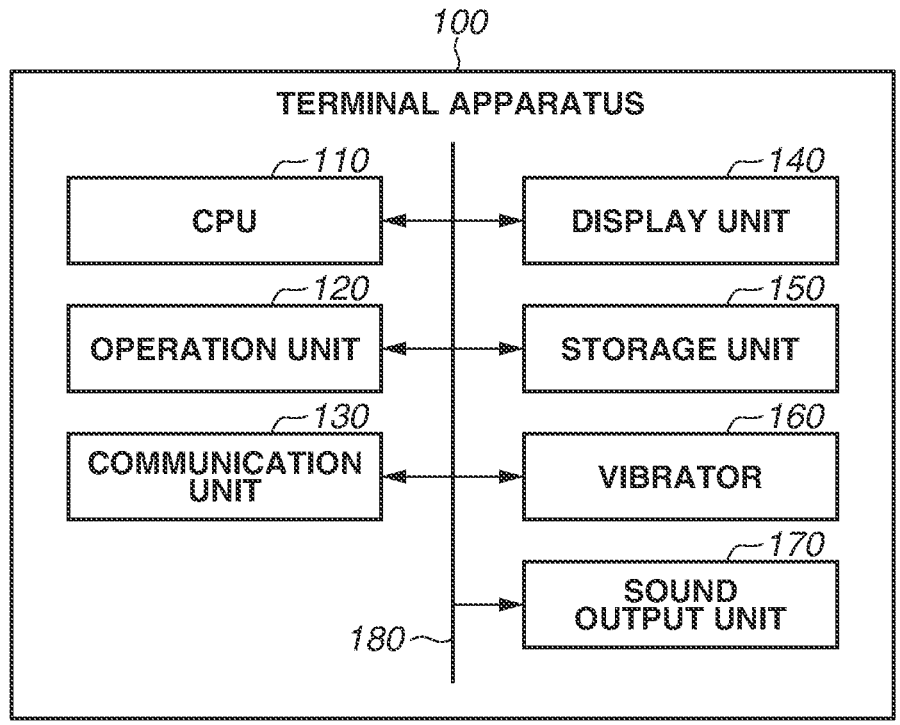
FIGS. 2A and 2B illustrate hardware configurations of a terminal apparatus and a push notification server.

FIG. 2A illustrates a hardware configuration of the terminal apparatus 100. The terminal apparatus 100 includes a central processing unit (CPU) 110, an operation unit 120, a communication unit 130, a display unit 140, a storage unit 150, a vibrator 160, and a sound output unit 170. These units are connected with each other via a system bus 180.

The CPU 110 includes one or more processors, circuitry, or combinations thereof, and as a system control unit controls the entire terminal apparatus 100. The operation unit 120 accepts user operations. The operation unit 120 includes, for example, a mouse, a keyboard, and a touch panel. The communication unit 130 performs communication with other apparatuses. The communication unit 130 includes, for example, a Universal Serial Bus (USB) interface, a wire-lined Local Area Network (LAN) interface, and a wireless LAN interface, and performs communication with the push notification server 200. The display unit 140 displays images and information. The display unit 140 includes, for example, a screen such as a liquid crystal display (LCD) and outputs the contents of a push notification information by displaying the contents on the LCD. The storage unit 150 includes, for example, a read only memory (ROM) and a random access memory (RAM), and stores various types of data and programs. The storage unit 150 is also used as a work area and a temporary storage area used when executing various programs. Programs stored in the storage unit 150 include an OS 101 and an application 102. As an example of the application 102, an application for message exchange (chat application) will be described below. The chat application enables a user, for example, to make a group of a plurality of persons or a group of a pair of persons, and perform message exchange in a chat form. The chat application also enables the user to use messages in a text or a stamp format. The chat application may have a phone call function or a function of transmitting a still or a moving image. The application 102 may have other functions. For example, the application 102 may be an application that enables texts or images posted by the user to be viewed by another user. The application 102 may be an application that instructs a printer (not illustrated) to perform printing or an application capable of executing a push notification function (described below). For example, the application 102 is installed by an external server through the Internet communication via the communication unit 130 and then stored in the storage unit 150. Software other than the OS 101 and the application 102 may be stored in the storage unit 150. The vibrator 160 generates a vibration and informs the user that the terminal apparatus 100 has received information, by using the vibration or a vibration sound. The sound output unit 170 outputs a sound. The sound output unit 170 includes, for example, a speaker and informs the user that the terminal apparatus 100 has received information, by using a sound such as a beep sound.

Figure 2B:
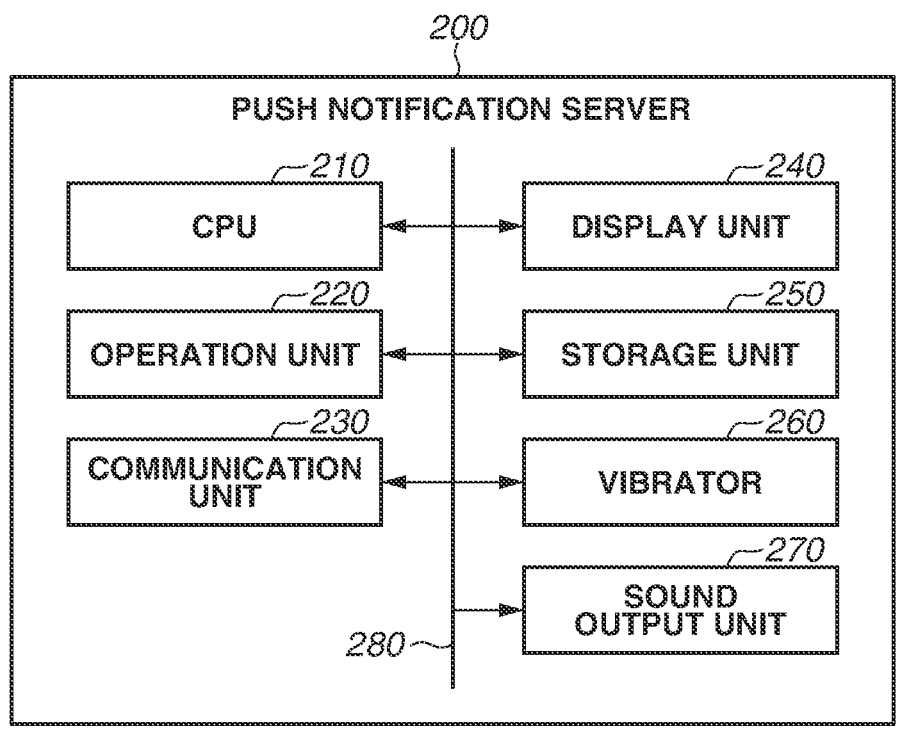

FIG. 2B illustrates a hardware configuration of the push notification server 200. The push notification server 200 includes a CPU 210, an operation unit 220, a communication unit 230, a display unit 240, and a storage unit 250. These units are connected with each other via a system bus 280. Each component of the push notification server 200 has a similar function to each component of the terminal apparatus 100. The push notification server 200 communicates with a management server (not illustrated) that generates push notification information, and acquires the generated push notification information from the management server. An example where the push notification server 200 according to the present exemplary embodiment includes one server apparatus (information processing apparatus) will be described below. However, the functions executed by the push notification server 200 may be executed by a plurality of cloud servers operating in a collaborative manner. More specifically, the push notification server 200 may include a plurality of server apparatuses. A server having one server apparatus or a plurality of server apparatuses is referred to as a server system. As used herein, the term "unit" generally refers to software, firmware, hardware, circuitry, or combinations thereof that is used to effectuate a purpose.

The push notification function will now be described. The push notification function as a function of the OS 101 executes notification operations based on push notification information transmitted from the push notification server 200. According to the present exemplary embodiment, the notification operations include a display operation, a sound output operation, a vibration operation, and a lighting operation. The display operation refers to an operation for displaying the contents of the push notification information transmitted from the push notification server 200, in a push notification area. The push notification area may be a notification area, such as Toast, Notification, SnackBar, and Dialog. According to the present exemplary embodiment, information about services or campaigns regarding the application 102 operating on the terminal apparatus 100 is notified to the user by the push notification function. Other contents may be notified to the user by the push notification function. The sound output operation refers to an operation for outputting a sound from the sound output unit 170. The vibration operation refers to an operation for vibrating the vibrator 160. The lighting operation refers to an operation for turning on the display of the terminal apparatus 100 and, if the terminal apparatus 100 includes a light-emitting unit (not illustrated), turning on the light-emitting unit. Performing these notification operations enables notifying the user of the reception of the push notification information. Thus, the push notification information refers to information for displaying the push notification area or information for executing notification operations.

The OS 101 includes an OS notification setting 1 and an OS notification setting 2 as push notification settings. The OS notification setting 1 is a function of setting, for each application, whether to execute (enable) the push notification function upon reception of the push notification information about a certain application. More specifically, the OS notification setting 1 enables the user to select whether to execute the notification operations based on the push notification information. The OS notification setting 2 enables the user to enable which of the plurality of operations included in the notification operations when the push notification function is enabled in the OS notification setting 1. For example, the user can select whether to execute either the sound operation or the vibration operation as a notification operation. When the OS notification setting 1 is disabled, no notification operation is executed. Even when the OS notification setting 1 is enabled, no notification operation is executed when no notification operation is enabled in the OS notification setting 2. Whether to execute the vibration operation may be determined according to whether a manner mode (described below) is enabled. The display operation is enabled when the push notification function is enabled in the OS notification setting 1, and disabled when the push notification function is disabled in the OS notification setting 1. More specifically, the display operation cannot be separately enabled or disabled in the OS notification setting 2, and operations other than the display operation are enabled or disabled in the OS notification setting 2. The display operation may be included in the OS notification setting 2 and separately enabled or disabled in the OS notification setting 2.

Further, the application 102 can execute the application notification settings 1 and 2 as settings related to the push notification. The application notification setting 1 is a function of setting whether to instruct the OS 101 to execute the push notification function upon reception of the push notification information about the application 102. The application notification setting 1 enables the user to select whether the application 102 instructs the OS 101 to execute the push notification function related to the application 102. The application notification setting 2 is a function of setting whether to enable which of the plurality of operations included in the notification operations when the push notification function is enabled in the application notification setting 1. For example, the user can select whether to instruct the OS 101 to execute the sound operation or vibration operation as notification operation. When the application notification setting 1 is disabled, no notification operation is executed. Even when the application notification setting 1 is enabled, no notification operation is executed when no notification operation is enabled in the application notification setting 2. The display operation is certainly enabled when the push notification function is enabled in the application notification setting 1, and certainly disabled when the push notification function is disabled in the application notification setting 1. More specifically, the display operation cannot be separately enabled or disabled in the application notification setting 2, and operations other than the display operation are enabled or disabled in the application notification setting 2. The display operation may be included in the application notification setting 2. According to the present exemplary embodiment, which of the OS notification settings 1 and 2 and the application notification settings 1 and 2 are applied at which timing in execution of the push notification function will be described in detail below. When the application 102 is not provided with the application notification setting 2, the notification operations may be executed based on the OS notification setting 2. More specifically, when the application 102 not having the application notification setting 2 instructs the OS 101 to execute the push notification function according to the exemplary embodiment (described below), the application 102 instructs the OS 101 only to execute the push notification function, and the OS 101 having received the instruction executes the notification operations based on the OS notification setting 2.

The push notification function includes push notification functions A and B. With the push notification function A, the OS 101 executes the push notification function without transmitting the acquired push notification information to the application 102. More specifically, the OS 101 acquires the push notification information from the push notification server 200 and controls whether to execute the push notification function according to the OS notification settings. With the push notification function B, the OS 101 transmits the acquired push notification information to the application 102 and executes the push notification function according to an instruction from the application 102. More specifically, the OS 101 acquires the push notification information from the push notification server 200 and transmits the push notification information to the application 102. Then, the application 102 instructs the OS 102 to execute the push notification function according to the result of analyzing the application notification settings 1 and 2 and the push notification information. The OS 101 then controls whether to execute the push notification function according to the instruction of the application 102 and the OS notification settings. The control may be performed in the following way. When the push notification function related to the application 102 is disabled in the OS notification setting 1 with the push notification function B, the OS 101 does not transmit the push notification information to the application 102. When the push notification function related to the application 102 is enabled in the OS notification setting 1, the OS 101 transmits the push notification information to the application 102.

The present disclosure will now be described centering on a form of determining the notification operations in the push notification function. The present disclosure may also be applied to a form of receiving information other than the push notification information and determining the notification operations when notifying the user of the relevant information.

When the OS 101 successively receives a plurality of pieces of the push notification information before a predetermined time period has elapsed and then executes the push notification function in succession, the notification operations may be executed in succession. If the notification operations are executed in succession, for example, the vibration sound generated by the vibration operation and the sound generated by the sound operation may be output in succession, and the user or a person around the terminal apparatus 100 may perceive the sounds as noise.

Further, successive lighting of the terminal apparatus 100 by a lighting operation or successive lighting of the screen thereof by the display operation may become a nuisance depending on the user's environment.

The terminal apparatus 100 may thus be provided with the manner mode function.

The manner mode is a function of preventing sound output even when the notification settings are set to output sound from the sound output unit 170. In a known case, when the manner mode is enabled, the OS 101 activates the vibrator to notify the user of the reception of a notification. However, even in a case where the manner mode is enabled, when the OS 101 executes the push notification function in succession, the vibration sound by the vibration of the vibrator 160 is output in succession, and the user and the person around the terminal apparatus 100 may perceive the sound as noise. If the vibrator 160 does not vibrate in a case where the manner mode is enabled, the user may be unable to notice the notification when the vibrator 160 does not vibrate.

No notification operation is executed by disabling the push notification function in the OS notification settings. However, the user may be unable to notice the reception of the push notification information since the notification operations are disabled, resulting in degraded usability. It may be troublesome for the user to set whether to execute the push notification function through the OS notification settings. In a case where the push notification function is enabled, it is thus demanded to reduce the possibility that the notification operations become a nuisance to the user even upon reception of the push notification information in succession.

According to the present exemplary embodiment, the OS 101 therefore determines whether the push notification information about the application 102 is received after a predetermined time period has elapsed since the last reception of the push notification information about the application 102. When the push notification information is received before the predetermined time period has elapsed since the last reception of the push notification information, the OS 101 performs controls not to execute the push notification function based on the received push notification information. In other words, the OS 101 performs control not to execute the notification operations, such as the display and the vibration operations, based on the push notification information received last and the push notification information received in succession.

Thus, in a case where the push notification function is enabled, it is possible to reduce the possibility that the notification operations become a nuisance to the user even upon reception of the push notification information in succession.

Figure 3A:
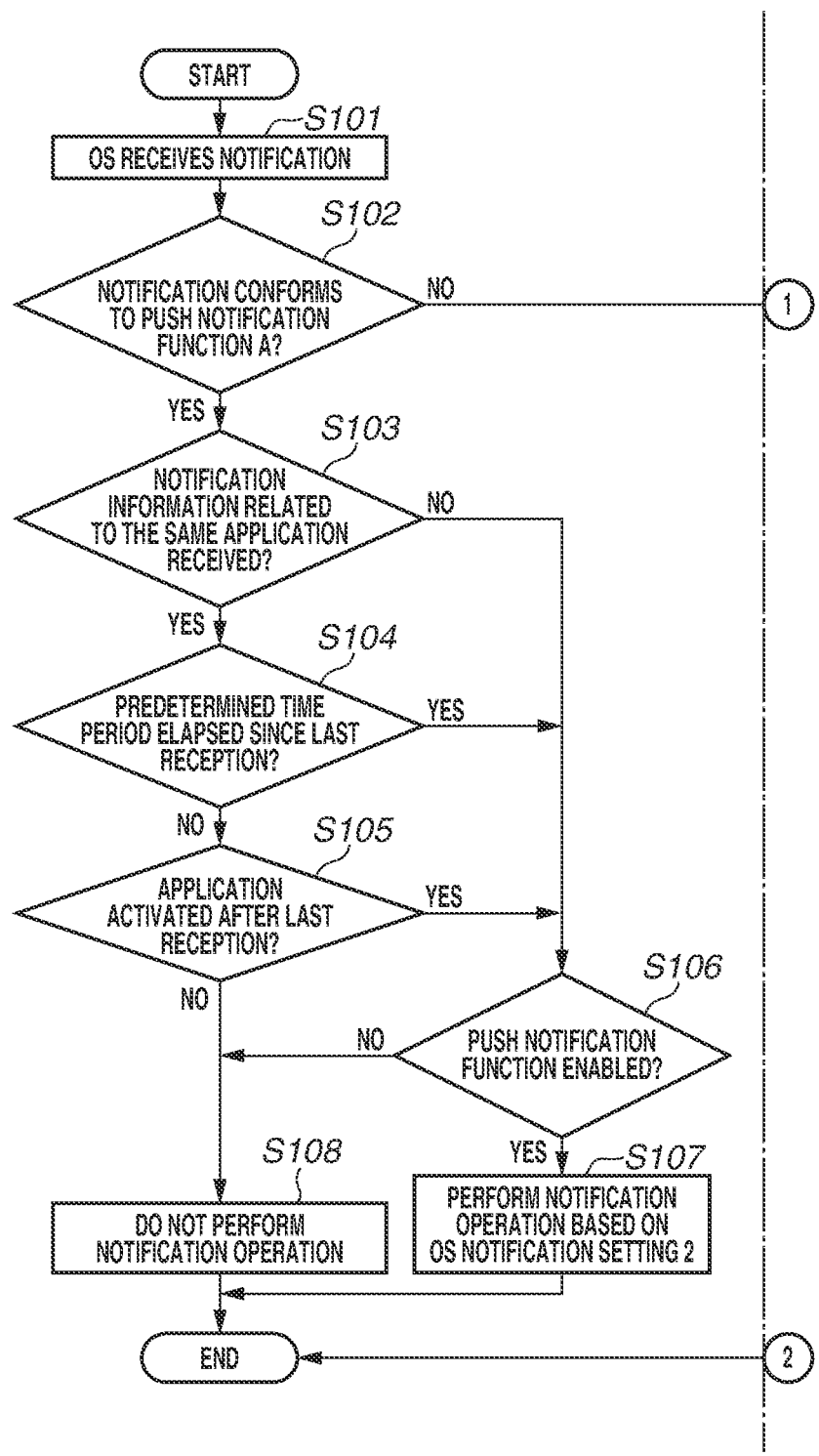
FIGS. 3A and 3B illustrate a flowchart of processing for determining an operation of a push notification function.
Figure 3B:
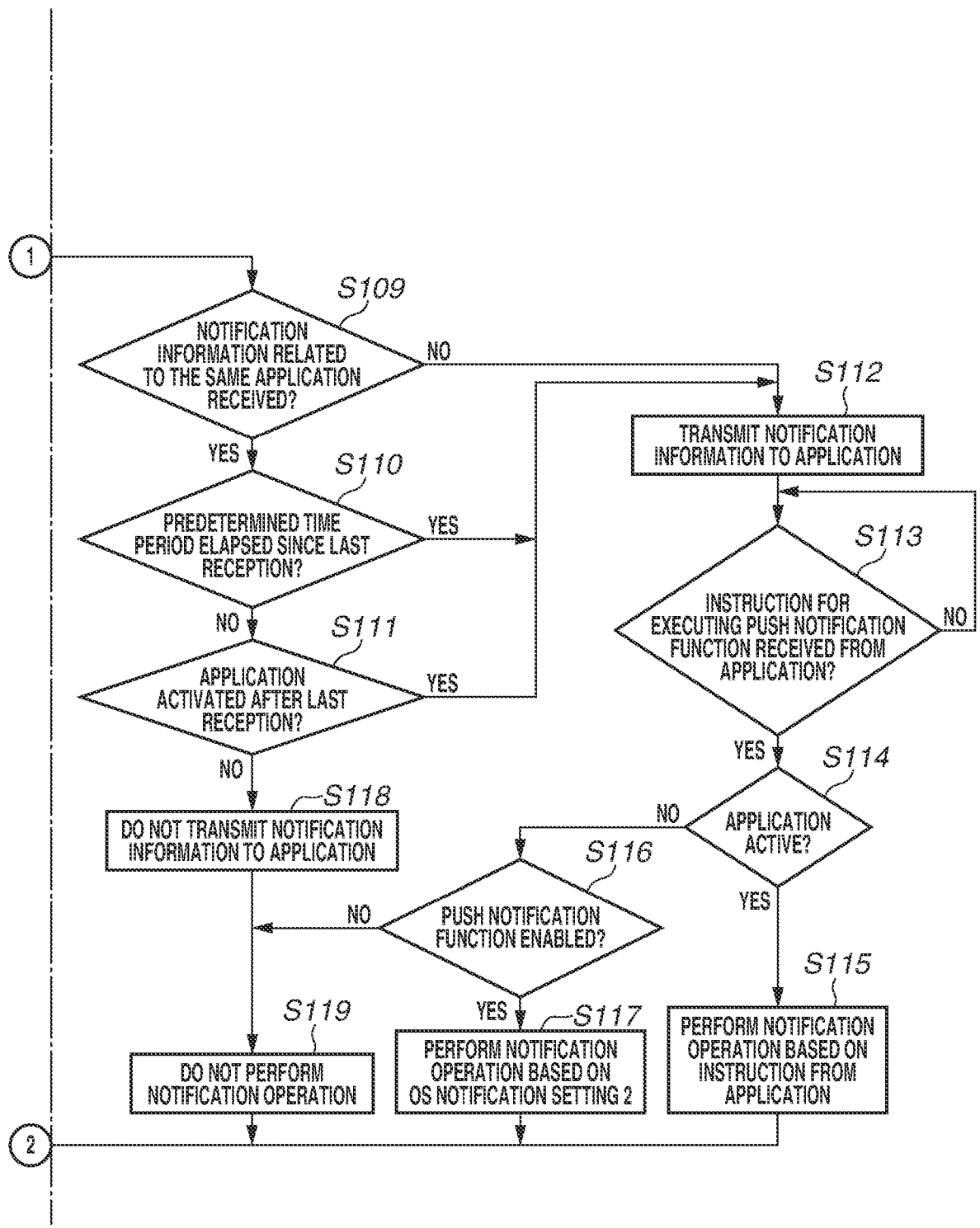

FIGS. 3A and 3B illustrate a flowchart of processing in which the OS 101 controls the notification operations in the push notification function A.

In step S101, the OS 101 receives (acquires) the push notification information from the push notification server 200. The push notification information includes information indicating which of the applications included in the terminal apparatus 100 the push notification information is related to. According to the present exemplary embodiment, the push notification information received in step S101 is the push notification information about the application 102.

In step S102, the OS 101 determines which of the push notification functions A and B the push notification information received in step S101 conforms to. Which of the push notification functions A and B the notification based on the push notification information conforms to is determined for each individual application program. Thus, the OS 101 determines whether the push notification information is related to an application conforming to the push notification function A. Assuming that an identification tag is included in the push notification information, the OS 101 may perform the above-described determination by referring to the identification tag. In other words, when the push notification information includes an identification tag, the OS 101 may determine that the push notification information conforms to the push notification function B. When the push notification information includes no identification tag (or a tag different from an identification tag), the OS 101 may determine that the push notification information conforms to the push notification function A. Whether to include an identification tag in the push notification information is controlled by, for example, the management server that generates the push notification information. When the push notification information conforms to the push notification function A (YES in step S102), the processing proceeds to step S103. When the push notification information conforms to the push notification function B (NO in step S102), the processing proceeds to step S109.

In step S103, the OS 101 determines whether the push notification information about the application 102 has been received before the reception in step S101. When it is determined that the push notification information has been received before step S101 (YES in step S103), the processing proceeds to step S104. When it is determined that the push notification information has not been received before step S101 (NO in step S103), the processing proceeds to step S106. In this determination, even if the push notification information about an application other than the application 102 has been received before step S101, the result of this determination is "NO" when the push notification information about the application 102 has not been received before step S101.

In step S104, the OS 101 determines whether the push notification information about the application 102 (present push notification information) received in step S101 is received after the predetermined time period has elapsed since the last reception of the push notification information about the application 102. When it is determined that the push notification information is received after the predetermined time period has elapsed (YES in step S104), the processing proceeds to step S106. When it is received that the push notification information is received before the predetermined time period has elapsed (NO in step S104), the processing proceeds to step S105. The predetermined time period is preset by the OS 101.

In step S105, the OS 101 determines whether the application 102 has been activated by the user after the last reception of the push notification information about the application 102. The application 102 is activated, for example, when the user operates the icon of the application 102 from the home screen of the terminal apparatus 100. The application 102 may be activated when the user performs an operation on the push notification area displayed upon execution of the push notification function based on the push notification information about the application 102. When it is determined that the application 102 has been activated by the user (YES in step S105), the processing proceeds to step S106. When it is determined that the application has not been activated by the user (NO in step S105), the processing proceeds to step S108.

In step S106 followed by the determination of "NO" in step S103, "YES" in step S104, or "YES" in step S105, the OS 101 determines whether the push notification function is enabled in the OS notification setting 1. In other words, the OS 101 determines whether the push notification function is set to be executed in the OS notification setting 1. When it is determined that the push notification function is set to be executed (YES in step S106), the processing proceeds to step S107. When it is determined that the push notification function is not set to be executed (NO in step S106), the processing proceeds to step S108.

In step S107, the OS 101 executes the notification operations based on the push notification information about the application 102 by using the push notification function A. In other words, the OS 101 executes the notification operations based on the OS notification setting 2 by using the push notification function A. For example, when the push notification function related to the application 102 is enabled, the display and vibration operations of the notification operations are enabled, and other operations thereof are disabled in the notification operation setting of the OS notification settings, the OS 101 executes the display and vibration operations out of the notification operations but does not execute other operations. That is, the OS 101 displays the push notification area based on the push notification information on the screen of the terminal apparatus 100, and controls the vibrator 160 to generate a vibration. When the push notification function related to the application 102 is disabled in the OS notification settings, the OS 101 does not execute the push notification function. In other words, the OS 101 executes no notification operation.

In step S108 followed by the determination of "NO" in step S106, the OS 101 sets not to execute the notification operations based on the push notification information. That is, the OS 101 executes no notification operation based on the push notification information. In other words, when the user performs no operation on the application 102, the OS 101 recognizes that the user has not confirmed the latest push notification information, and therefore executes none of the notification operations set in the OS notification settings. For example, even when the display and vibration operations are enabled in the OS notification settings, the OS 101 does not display the push notification area based on the push notification information on the screen of the terminal apparatus 100 and controls the vibrator 160 not to generate a vibration.

Processing in steps S109 to S111 is similar to the processing in steps S103 to S105, respectively, and thus redundant descriptions thereof will be omitted.

In step S112 followed by the determination of "NO" in step S109, "YES" in step S110, or "YES" in step S111, the OS 101 determines to execute the notification operations based on the push notification information by using the push notification function B, and transmits the push notification information to the application 102.

In step S113, the OS 101 determines whether an instruction for executing the push notification function has been received from the application 102. When the instruction has been received (YES in step S113), the processing proceeds to step S114. When the instruction has not been received (NO in step S113), the processing repeats this determination. When the OS 101 sets "NO" as a result of the determination in step S113, the processing may terminate this flowchart. In other words, the OS 101 executes no notification operation. The case where the OS 101 sets "NO" as a result of this determination is a case where the OS 101 executes no notification operation while the application 102 is active even in a case where the application notification settings 1 and 2 are enabled, for example.

In step S114, the OS 101 determines whether the application 102 is currently active. The OS 101 determines whether to execute the push notification function based on the OS notification setting 1 or the application notification setting 1, depending on whether the application 102 is currently active. The OS 101 also determines what kind of notification operation to execute based on the OS notification setting 2 or the application notification setting 2, depending on whether the application 102 is currently active. When the application 102 is currently active, the OS 101 determines whether to execute the push notification function based not on the OS notification setting 1 but on the application notification setting 1. For example, when the push notification function is enabled in the application notification setting 1, the OS 101 executes the push notification function through notification operations based on the application notification setting 2. When the OS 101 determines "YES" in step S113, the instruction for executing the push notification function from the application 102 is accepted, and therefore the application notification setting 1 is enabled. For example, when the application 102 is not currently active, the OS 101 determines whether to execute the push notification function based on the OS notification setting 1. For example, when the push notification function is enabled in the OS notification setting 1 (YES in step S116 described below), the OS 101 executes the push notification function through notification operations based on the OS notification setting 2 (in step S117 described below).

Some applications do not include the application notification setting 1 or 2. In this case, the OS 101 may determine whether to execute the push notification function based on the OS notification setting 1 or 2 regardless of whether the application 102 is currently active. There is also a case where the application from which the OS 101 receives the instruction for executing the push notification function is not provided with the application notification setting 2, and the application 102 is currently active. In this case, the OS 101 may execute the push notification function based on the OS notification setting 2. When it is determined that the application 102 is currently active (YES in step S114), the processing proceeds to step S115. When it is determined that the application 102 is not currently active (NO in step S114), the processing proceeds to step S116.

In step S115, the OS 101 executes the notification operations based on the push notification information following the instruction from the application 102. As described above, the OS 101 executes the push notification function through notification operations based on the application notification setting 2.

Processing in steps S116 and S117 are similar to the processing in steps S106 and S107, and thus descriptions thereof will be omitted.

In step S118 followed by the determination of "NO" in step S111, the OS 101 determines not to execute the notification operations based on the push notification information and hence does not transmit the push notification information to the application 102. In this case, since the OS 101 does not receive the instruction for executing the push notification function from the application 102, the OS 101 executes no notification operation based on the push notification information in step S114.

As described above, the OS 101 determines whether the push notification information about the application 102 is received after a predetermined time period has elapsed since the last reception of the push notification information about the application 102, according to the present exemplary embodiment. When the OS 101 determines that the push notification information is received before the predetermined time period has elapsed since the last reception of the push notification information, the OS 101 performs control not to execute the notification operations based on the received push notification information. Thus, in a case where the push notification function is enabled, it is possible to reduce the possibility that the notification operations become a nuisance to the user even upon reception of the push notification information in succession.

According to the exemplary embodiment described above, the OS 101 can inform the user of the notification by executing the notification operations when the push notification information about the application 102 is newly received. When the OS 101 determines that the push notification information about the application 102 is received in step S101 after the predetermined time period has elapsed since the last reception of the push notification information about the application 102, the OS 101 can inform the user of the notification by executing the notification operations. Further, even in a case where the present push notification information is received before the predetermined time period has elapsed since the last reception of the push notification information, the OS 101 can inform the user of the notification based on the push notification information received in step S101 by executing notification operations in a case where the user performs an operation on the application 102.

In this flowchart, the processing may be performed in the following way. The OS 101 performs the determination in step S106 after the processing in step S102. When the OS 101 determines "NO" in step S106, the processing skips steps S103 to S105 and proceeds to step S108. When the OS 101 determines "YES" in step S106, the OS 101 may perform the determination processing in steps S103 to S105. In this case, the processing may proceed to step S107 when the OS 101 determines "YES" in steps S103 to S105.

In this flowchart, the determination processing in step S104 may be omitted. More specifically, the processing may proceed to step S106 when it is determined that the push notification information about the application 102 has been received in step S101 after the predetermined time period has elapsed since the last reception of the push notification information about the application 102 in step S103. In this case, the notification operations may not be executed.

In this flowchart, the determination processing in step S114 may be omitted. More specifically, as an example of an applicable form, the OS 101 may certainly execute the notification operations based on either the application notification settings 1 and 2 or the OS notification settings 1 and 2 regardless of whether the application 102 is currently active.

In this flowchart, the processing in steps S109 to S111 and S118 may be omitted. More specifically, when the push notification information is determined to conform to the push notification function B (NO in step S102), the processing may proceed to step S112. In step S112, the OS 101 may transmit the push notification information to the application 102. In this case, as described in a second exemplary embodiment, the application 102 to which the push notification information is transmitted may perform the determinations in steps S109 to S111 and control whether to instruct the OS 101 to execute the push notification function based on the determination results.

In this case, if the instruction for executing the push notification function is received from the application 102 in step S113, the OS 101 performs the processing in step S114. In this way, which of the OS 102 and the application 102 determines to execute the push notification function may be controlled according to which of the push notification function A and the push notification function B the received push notification information conforms to.

In step S107, regardless of the state where the push notification function is enabled in the OS notification setting 1, not all of the operations are executed. However, the processing is not limited thereto. As an example of an applicable form, at least one of the operation and the display operation enabled in the OS notification setting 2 out of notification operations may be executed regardless of the state where the push notification function is effectively set by the OS notification setting 1. As another example of an applicable form, in step S107, the display operation is executed but other notification operations may be not executed. As still another example of an applicable form, the display and the lighting operations are executed but other notification operations may be not executed. Which of the notification operations is to be executed and which of the notification operations is not be executed may be predetermined or set by the user.

In the first exemplary embodiment, the OS 101 receives the push notification information about the application 102, and determines whether to execute the notification operations depending on whether the push notification information is received before the predetermined time period has elapsed since the last reception of the push notification operation. However, a second exemplary embodiment will be described below centering on processing where the application 102 receives the push notification information about the application 102 from the OS 101, and determines whether to execute the notification operations depending on whether the push notification information is received before the predetermined time period has elapsed since the last reception of the push notification operation. More specifically, the second exemplary embodiment will be described below centering on processing where the application 102 determines whether to execute the notification operations in the push notification function in execution of the above-described push notification function B. The second exemplary embodiment will be described below centering on differences from the first exemplary embodiment.

Figure 4:
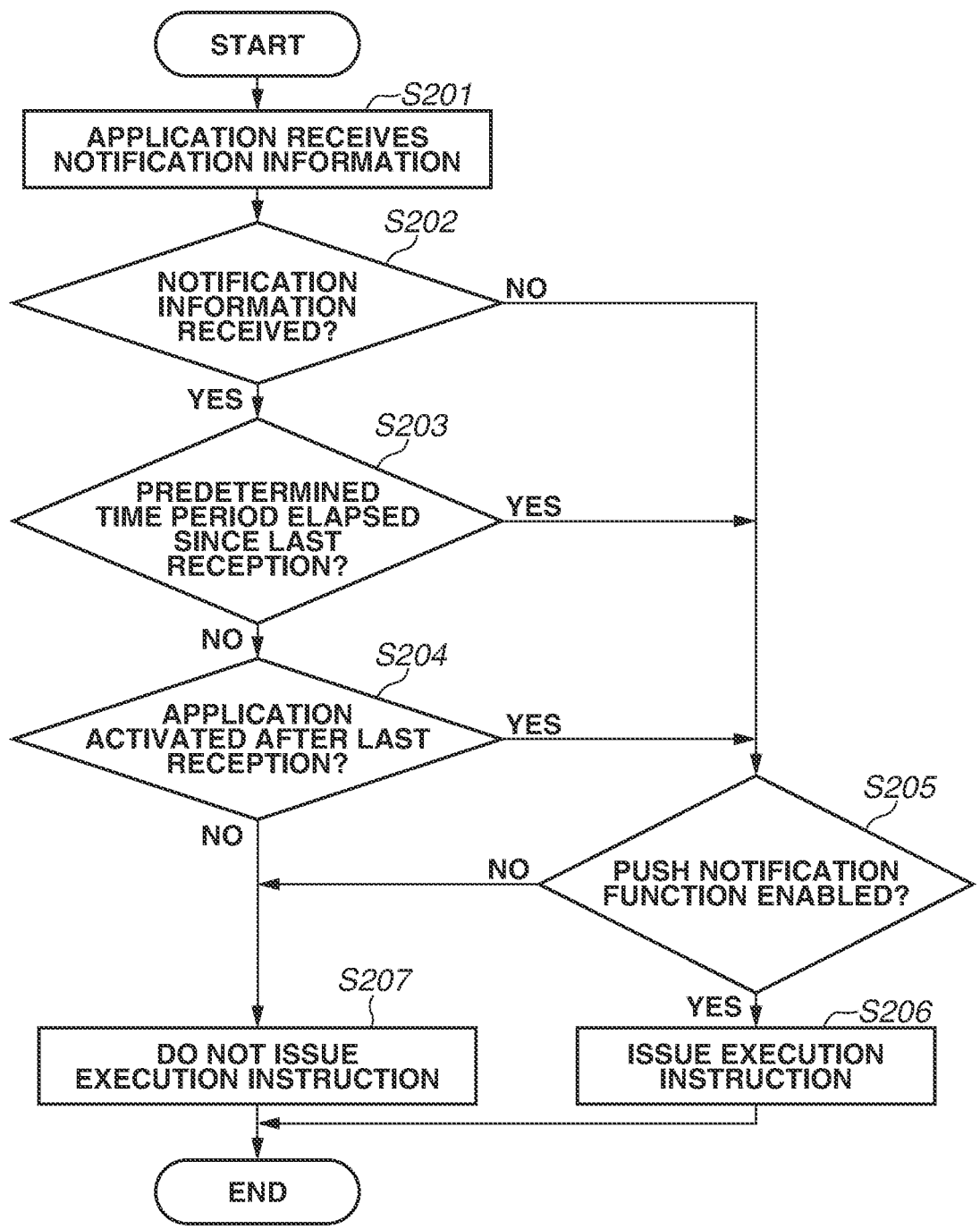
FIG. 4 is another flowchart illustrating processing for determining an operation of the push notification function.

FIG. 4 is a flowchart illustrating processing for determining whether the application 102 executes the notification operations in the push notification function B. The OS 101 transmits the received push notification information to the application 102. In other words, for example, the OS 101 stores the push notification information in the storage unit 150. Part of the push notification information to be stored by the OS 101 may not coincide with the push notification information acquired from the push notification server 200. More specifically, the OS 101 may generate new push notification information B used for the application 102 to determine whether to execute the notification operations from the received push notification information A, and store the generated information in the storage unit 150. The application 102 may generate and acquire the push notification information B. In the following descriptions, the push notification information A and the push notification information B will be described as push notification information without being distinguished from each other.

In step S201, the application 102 receives the push notification information from the OS 101. More specifically, for example, the application 102 acquires the push notification information stored in the storage unit 150.

Processing in steps S202 to S204 is similar to the processing in steps S103 to S105 in FIG. 3A, respectively, except that the processing entity is the application 102, and thus descriptions thereof will be omitted. In step S203, the application 102 determines whether the push notification information (present push notification information) is received in step S201 after the predetermined time period has elapsed since the last reception of the push notification information. The application 102 may determine whether the present push notification information is received by the OS 101 after the predetermined time period has elapsed since the last reception of the push notification information by the OS 101. The application 102 may determine whether the present push notification information is received by the application 102 after the predetermined time period has elapsed since the last reception of the push notification information by the application 102.

In step S205 followed by the determination of "NO" in step S202, and "YES" in step S203, and "YES" in step S204, the application 102 determines whether the push notification function is enabled in the application notification setting 1. More specifically, the application 102 determines whether the push notification function is set to be executed in the application notification setting 1. When the push notification function is enabled (YES in step S205), the processing proceeds to step S206. When the push notification function is disabled (NO in step S205), the processing proceeds to step S207.

In step S206, the application 102 instructs the OS 101 to execute the notification operations based on the push notification information about the application 102. In other words, the application 102 instructs the OS 101 to execute the notification operations according to the application notification setting. For example, when the vibration operation is enabled in the application notification setting 2, the application 102 displays the push notification area based on the push notification information on the screen of the terminal apparatus 100, and instructs the vibrator 160 to generate a vibration. When the push notification function is disabled in the application notification setting 1, the application 102 does not instruct the OS 101 to execute the push notification function. In other words, the application 102 does not instruct the OS 101 to execute the notification operations.

In step S207 followed by the determination of "NO" in step S205, the application 102 does not instruct the OS 101 to execute the notification operations based on the push notification information. More specifically, when the user performs no operation on the application 102, the application 102 recognizes that the user has not checked the last push notification information and hence does not instruct the OS 101 to execute any notification operation set in the application notification setting 2. For example, even when the vibration operation is enabled in the application notification setting 2, the application 102 does not display the push notification area based on the push notification information on the screen of the terminal apparatus 100, and does not instruct the OS 101 to generate a vibration via the vibrator 160.

According to the present exemplary embodiment, the OS 101 performs processing in steps S113 to S117 and S119 in FIG. 3B after transmitting the push notification information to the application 102. More specifically, when the instruction for executing the notification operations has been received from the application 102 as a result of the determination in step S113, then in step S114, the OS 101 determines whether the application 102 is currently active. Based on the result of the determination in step S114, the OS 101 then determines which of the application notification settings 1 and 2 and the OS notification settings 1 and 2 the OS 101 executes the notification operations based on. For example, when the application 102 is currently active, the OS 101 executes the push notification operation based on the application notification setting 2. The determination processing in step S114 may be omitted. More specifically, as an example of an applicable form, the OS 101 may certainly execute the notification operations based on either the application notification settings 1 and 2 or the OS notification settings 1 and 2 regardless of whether the application 102 is currently active.

According to the present exemplary embodiment, the application 102 instructs the OS 101 to execute the push notification operation based on the OS notification setting 2 when the application 102 is not provided with the application notification setting 2. According to the present exemplary embodiment, the application 102 determines whether the push notification information about the application 102 is received after the predetermined time period has elapsed since the last reception of the push notification information about the application 102. When the application 102 determines that the push notification information is received before the predetermined time period has elapsed since the last reception of the push notification information, the application 102 instructs the OS 101 not to execute the notification operations in execution of the push notification function based on the received push notification information. Thus, in a case where the push notification function is enabled, it is possible to reduce the possibility that the notification operations become a nuisance to the user even upon reception of the push notification information in succession.

The second exemplary embodiment has been described above centering on processing where the application 102 receives the push notification information about the application 102 from the OS 101, and determines whether to execute the notification operations depending on whether the push notification information is received before a predetermined time period has elapsed since the last reception of the push notification information. A third exemplary embodiment will be described below centering on processing where the application 102 determines whether to execute the notification operations depending on whether the received push notification information about the category A of the application 102 is the last received push notification information about the category A of the application 102. More specifically, when the above-described push notification function B is executed, the application 102 determines whether to execute the notification operations based on information about whether the received push notification information is push notification information belonging to the same category of the same application 102 as the last received push notification information, and information about whether the received push notification information is acquired before the predetermined time period has elapsed since the last acquisition of the push notification information. Differences of the present exemplary embodiment from the first and the second exemplary embodiments will be mainly described below.

Figure 5:
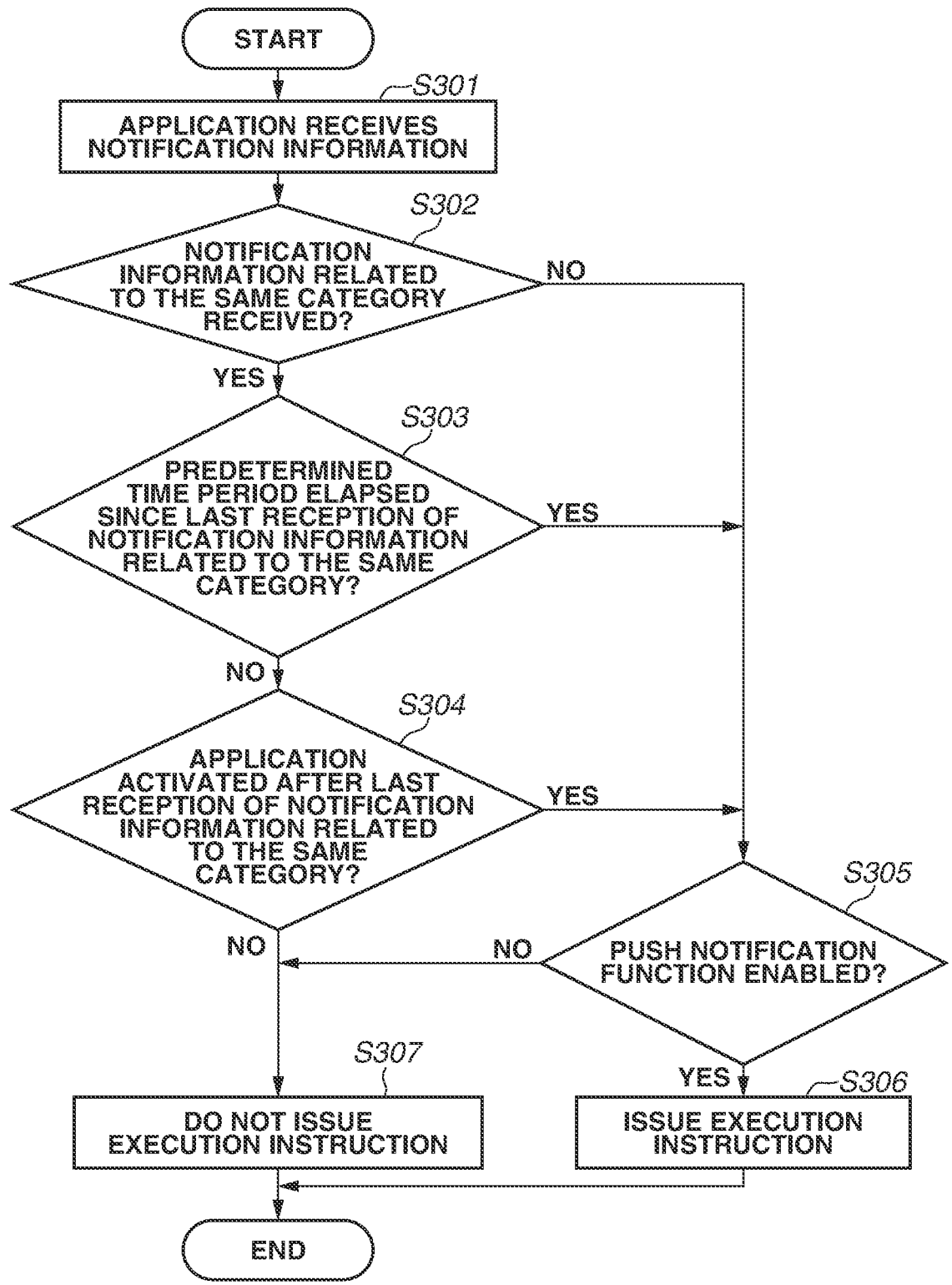
FIG. 5 is still another flowchart illustrating processing for determining an operation of the push notification function.

FIG. 5 is a flowchart illustrating processing for determining whether the application 102 executes the notification operations in the push notification function B. The OS 101 transmits the received push notification information to the application 102. In other words, for example, the OS 101 stores the push notification information in the storage unit 150. Part of the push notification information to be stored by the OS 101 may not coincide with the push notification information acquired from the push notification server 200. More specifically, the OS 101 may generate new push notification information B used for the application 102 to determine whether to execute the notification operations from the received push notification information A, and store the generated information in the storage unit 150. The application 102 may generate and acquire the push notification information B. In the following descriptions, the push notification information A and the push notification information B will be described as push notification information, without being distinguished from each other.

Processing in step S301 is similar to the processing in step S201 in FIG. 4, and thus descriptions thereof will be omitted.

In step S302, the application 102 determines whether the push notification information about the category A of the application 102 has been received before the reception in step S101. When the application 102 is a chat application, for example, the category A is a predetermined chat group. Examples of the chat group include a chat group consisting of a plurality of persons and a chat group consisting of a pair of persons. For example, the push notification information received in step S301 is assumed to be push notification information about a chat group X in the application 102. In this case, the application 102 determines whether the push notification information about the chat group X in the application 102 has been received before the reception in step S301. For example, the category A refers to a person named Y (hereinafter referred to as a person Y) out of a plurality of persons belonging to the chat group X. For example, the push notification information received in step S301 is assumed to be push notification information about the person Y out of the plurality of persons belonging to the chat group X in the application 102. In this case, the application 102 may determine whether the push notification information about the person Y out of the plurality of persons belonging to the chat group X in the application 102 has been received before the reception in step S301. The category A is, for example, predetermined messages. Examples of messages include text format messages and stamp format messages. For example, the push notification information received in step S301 is assumed to be push notification information about stamp format messages in the application 102. In this case, the application 102 may determine whether the push notification information about stamp format messages in the application 102 has been received before the reception in step S301. Further, the category A may be predetermined messages of a predetermined chat group. More specifically, the push notification information received in step S301 is assumed to be stamp format messages of the chat group X in the application 102. In this case, the application 102 may determine whether the push notification information about stamp format messages of the chat group X has been received before the reception in step S301. When it is determined that the push notification information has been received before the reception in step S301 (YES in step S302), the processing proceeds to step S303. When it is determined that the push notification information has not been received before the reception in step S301 (NO in step S302), the processing proceeds to step S305.

In step S303, the application 102 determines whether the push notification information (present push notification information) related to the category A of the application 102 is received in step S301 after the predetermined time period has elapsed since the last reception of the push notification information about the category A of the application 102. When it is determined that the present push notification information is received in step S301 after the predetermined time period has elapsed (YES in step S303), the processing proceeds to step S305. When it is determined that the present push notification information is received in step S301 before the predetermined time period has elapsed (NO in step S303), the processing proceeds to step S304. The predetermined time is preset by the application 102.

In step S304, the application 102 determines whether the application 102 has been activated after the last reception of the push notification information about the category A of the application 102. The application 102 is activated, for example, when the user operates the icon of the application 102 from the home screen of the terminal apparatus 100. The application 102 may be activated when the user performs an operation on the push notification area displayed upon execution of the push notification function based on the push notification information about the application 102. The push notification information for displaying the push notification area to be operated may be the push notification information about the category A of the application 102 or the push notification information about a category other than the category A of the application 102. When it is determined that the application 102 has been activated after the last reception of the push notification information (YES in step S304), the processing proceeds to step S305. When it is determined that the application 102 has not been activated after the last reception of the push notification information (NO in step S304), the processing proceeds to step S307.

Processing in steps S305 to S307 is similar to the processing in steps S205 to S207 in FIG. 4, respectively, and thus descriptions thereof will be omitted.

According to the present exemplary embodiment, the application 102 determines whether the push notification information about the category A of the application 102 is received after the predetermined time period has elapsed since the last reception of the push notification information about the category A of the application 102. When the application 102 determines that the push notification information is received before the predetermined time period has elapsed since the last reception of the push notification information, the application 102 instructs the OS 101 not to execute the notification operations in execution of the push notification function based on the received push notification information. Thus, in a case where the push notification function is enabled, it is possible to reduce the possibility that the notification operations become a nuisance to the user even upon reception of the push notification information in succession. Upon reception of push notification information belonging to a different category, executing notification operations enables notifying the user of the reception of the push notification information belonging to a different category.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-193679, filed Nov. 29, 2021, which is hereby incorporated by reference herein in its entirety.

What is claimed is:

1. A non-transitory computer-readable storage medium storing a program for causing a computer of an information processing apparatus to execute operations, the operations comprising:
   first acquiring for acquiring first notification information related to one application program, wherein the first notification information is information for executing notification operations and is based on a predetermined category corresponding to a predetermined function among a plurality of functions executable by the one application program;
   executing a plurality of operations included in the notification operations based on the first notification operation;
   second acquiring for acquiring second notification information for executing the notification operations, after acquiring the first notification information, the second notification information being different from the first notification information and also based on the predetermined category corresponding to the predetermined function among the plurality of functions executable by the one application program; and
   performing control not to execute at least one of a plurality of operations included in the notification operations based on the second notification information, in a case where the second notification information is acquired before a predetermined time period has elapsed since the acquisition of the first notification information,
   wherein the program further causes the computer to execute first determining whether the second notification information is acquired after the predetermined time period has elapsed since the acquisition of the first notification information,
   wherein, in a case where the second notification information is determined to have been acquired after the predetermined time period has elapsed since the acquisition of the first notification information, the control is performed to execute the notification operations based on the second notification information, and
   wherein, in a case where the second notification information is determined to have been acquired before the predetermined time period has elapsed since the acquisition of the first notification information, the control is performed not to execute the notification operations based on the second notification information received in succession.

2. The non-transitory computer-readable storage medium according to claim 1, wherein the first notification information and the second notification information are notification information based on the one application program.

3. The non-transitory computer-readable storage medium according to claim 2,
wherein, in a case where the second notification information is acquired in a state that the one application program is active, the control is performed to execute the notification operations based on the second notification information even if the second notification information is acquired before a predetermined time period has elapsed since the acquisition of the first notification information, and
wherein, in a case where the second notification information is acquired in a state that fits the one application program is not active, the control is performed not to execute the notification operations based on the second notification information.

4. The non-transitory computer-readable storage medium according to claim 1, wherein the predetermined category is at least one of a chat group in the one application program and a message format.

5. The non-transitory computer-readable storage medium according to claim 1, wherein the notification operations include at least one of a vibration operation for vibrating a vibrator of the information processing apparatus, a sound output operation via a sound output unit of the information processing apparatus, and a lighting operation via a display or a light-emitting unit of the information processing apparatus.

6. The non-transitory computer-readable storage medium according to claim 1, wherein, upon acquisition of the second notification information before the predetermined time period has elapsed since the acquisition of the first information, the control is performed to execute an operation to display contents based on the second notification information on a screen of the information processing apparatus among the plurality of operations, and not to execute at least one of the plurality of operations other than the operation to display contents.

7. The non-transitory computer-readable storage medium according to claim 1, wherein the notification operations include at least one of a display operation for displaying contents based on the first notification information on a screen of the information processing apparatus, a vibration operation for vibrating a vibrator of the information processing apparatus, a sound output operation via a sound output unit of the information processing apparatus, and a lighting operation via a display or a light-emitting unit of the information processing apparatus.

8. The non-transitory computer-readable storage medium according to claim 1, wherein the program is an operating system of the information processing apparatus.

9. The non-transitory computer-readable storage medium according to claim 8, wherein the operating system transmits the first notification information and the second notification information based on the one application program to the one application program.

10. The non-transitory computer-readable storage medium according to claim 8, wherein, upon reception of an instruction for notifying of the first notification information and the second notification information based on the one application program from the one application program, the operating system executes at least one of the notification operations.

11. The non-transitory computer-readable storage medium according to claim 8, wherein the control is performed not to execute the notification operations based on the second notification information before the predetermined time period has elapsed since the acquisition of the first notification information by the operating system.

12. The non-transitory computer-readable storage medium according to claim 1,
wherein the program for causing the computer of the information processing apparatus to execute operations is the one application program different from an operating system,
wherein the one application program receives the first notification information and the second notification information based on the one application program from an operating system, and
wherein the one application program instructs the operating system to notify of the first notification information and the second notification information based on the one application program.

13. The non-transitory computer-readable storage medium according to claim 1,
wherein the program comprises a notification setting for setting whether to enable execution of each of the plurality of operations included in the notification operations based on the second notification information, and
wherein, even in a case where at least one of the plurality of operations included in the notification operations based on the second notification information is enabled in the notification setting, the control is performed not to execute at least one of the plurality of operations included in the notification operations based on the second notification information upon acquisition of the second notification information in the second acquisition before the predetermined time period has elapsed since the acquisition of the first notification information.

14. An information processing apparatus comprising:
at least one processor configured to function as:
a first acquisition unit configured to acquire first notification information related to one application program, wherein the first notification information is information for executing notification operations and is based on a predetermined category corresponding to a predetermined function among a plurality of functions executable by the one application program;
executing a plurality of operations included in the notification operations based on the first notification operation;
a second acquisition unit configured to acquire second notification information for executing the notification operations, after acquiring the first notification information, the second notification information being different from the first notification information and also based on the predetermined category corresponding to the predetermined function among the plurality of functions executable by the one application program; and
a control unit configured to perform control not to execute at least one of a plurality of operations included in the notification operations based on the second notification information, in a case where the second notification information by the second acquisition unit is acquired before a predetermined time period has elapsed since the acquisition of the first notification information, wherein the control unit is further configured to execute first determining whether the second notification information is acquired after the predetermined time period has elapsed since the acquisition of the first notification information, wherein, in a case where the second notification information is determined to have been acquired after the predetermined time period has elapsed since the acquisition of the first notification information, the control unit is further configured to execute the notification operations based on the second notification information, and wherein, in a case where the second notification information is determined to have been acquired before the predetermined time period has elapsed since the acquisition of the first notification information, the control unit is further configured not to execute the notification operations based on the second notification information received in succession.

15. A method for controlling an information processing apparatus, the method comprising:

first acquiring for acquiring first notification information related to one application program, wherein the first notification information is information for executing notification operations and is based on a predetermined category corresponding to a predetermined function among a plurality of functions executable by the one application program;

executing a plurality of operations included in the notification operations based on the first notification operation;

second acquiring for acquiring second notification information for executing the notification operations, after acquiring the first notification information, the second notification information being different from the first notification information and also based on the predetermined category corresponding to the predetermined function among the plurality of functions executable by the one application program; and performing control not to execute at least one of a plurality of operations included in the notification operations based on the second notification information, in a case where the second notification information in the second acquisition is acquired before a predetermined time period has elapsed since the acquisition of the first notification information, performing control to execute first determining whether the second notification information is acquired after the predetermined time period has elapsed since the acquisition of the first notification information, wherein, in a case where the second notification information is determined to have been acquired after the predetermined time period has elapsed since the acquisition of the first notification information, performing control to execute the notification operations based on the second notification information, and wherein, in a case where the second notification information is determined to have been acquired before the predetermined time period has elapsed since the acquisition of the first notification information, performing control not to execute the notification operations based on the second notification information received in succession.

* * * * *